United States Patent [19]

Kolesar et al.

[11] 4,138,874
[45] Feb. 13, 1979

[54] ADJUSTABLE CONE MEMBER FOR ELECTRICAL COIL FORMATION

[75] Inventors: Mark Kolesar, North Huntingdon; Harry C. Rettger, Wilkins Township, Allegheny County, both of Pa.

[73] Assignee: Westinghouse Electric Corp., Pittsburgh, Pa.

[21] Appl. No.: 880,269

[22] Filed: Feb. 23, 1978

[51] Int. Cl.² .................. B21D 7/04; H02K 15/00
[52] U.S. Cl. ........................................ 72/306; 29/736
[58] Field of Search ............... 72/298, 299, 301, 303, 72/306, 403; 29/596, 605, 736

[56] References Cited

U.S. PATENT DOCUMENTS

| 1,001,244 | 8/1911 | Brown | 72/301 |
|---|---|---|---|
| 1,721,810 | 7/1929 | Carter | 29/596 |
| 2,962,076 | 11/1960 | Durham | 72/298 |
| 3,452,786 | 7/1969 | Lund et al. | 29/596 |

*Primary Examiner*—Michael J. Keenan
*Attorney, Agent, or Firm*—J. W. Keen

[57] ABSTRACT

An apparatus for forming electrical coil bars used in dynamoelectric machines of any size and cone angle. The apparatus includes at least one rotatable frusto-conical shaped member whose major diameter, minor diameter, and cone angle are adjustable to form coils for any sized dynamoelectric machine. By guiding an end portion of an electrical coil bar against the conical surface in a spiral configuration about the conical member's axis of rotation, the electrical coil bars may be caused to lie along a frusto-conical surface when assembled in the dynamoelectric machines. The frusto-conically shaped member has a plurality of radially extendible struts at one axial end thereof, a plurality of radially directed support members at the other axial end thereof, and a plurality of shaping ribs extending between the struts and support members. The shaping ribs are pivotally mounted at one end to the struts through pinned joints and slidably mounted at their other end to translation blocks which are, in turn, slidably mounted on the shaping ribs. The minor diameter of the frusto-conical member may be adjusted by radially extending the struts to any selected position and clamping them there. The major diameter may be adjusted by simultaneously pivoting the shaping ribs relative to the struts and sliding the translation blocks relative to the support members and shaping ribs. The relative sliding action obtains when fasteners disposed through cooperating slots and holes formed in the ribs and translation blocks, respectively, are loosened.

8 Claims, 4 Drawing Figures

ADJUSTABLE CONE MEMBER FOR ELECTRICAL COIL FORMATION

BACKGROUND OF THE INVENTION

1. Field of the Invention

This invention relates to electrical coil bars of dynamoelectric machines, and more particularly, to means for shaping the end portions of those coil bars.

2. Description of the Prior Art

Stator windings for dynamoelectric machines such as motors and generators often include a plurality of phase coils which are each formed by inserting a plurality of axially extending conductors or coil bars in a stator core and connecting selected coil bars at their ends. Such connections are generally made in the end turn regions of the stator and are called series connections. Such series connections join circumferentially separated coil bars necessitating coil bar angular displacements in the stator end turn regions for each joined pair of coil bars. Due to considerations such as the circumferential separation between connected coil bars, space limitations in the end turn regions, and avoidance of interference with other structural elements in the stator end turn regions, the stator coil bars are frequently bent radially outwardly, circumferentially about, and finally generally parallel with the axis of rotation of the particular machine's rotatable shaft. Assembly of such bent coil bars in dynamoelectric machines results in formation of frusto-conical surfaces in the dynamoelectric machine's end turn regions.

Prior coil forming techniques included the use of concave and convex forming blocks, frequently made of wood, which provided the foundation against which the conductors or coil bars were deformed so as to properly shape them through hammering, pushing, twisting, and bending. Such coil bar formation has traditionally been accomplished manually with considerable effort and has resulted in the lack of shape uniformity among coil bars since there was no way to accurately control the manual forces being applied. Such imprecise shape duplication of coil bars causes difficulties in both winding and serially connecting the coil bars. Such difficulties can adversely affect the utilizing machine's cost and quality and the lack of shape uniformity can promote non-interchangeability of replacement parts and decreased reliability due to residual stresses imposed on the coil bars. A further disadvantage of such prior art forming blocks is the vast amount of storage space needed to house the many different sized blocks required by the different sized dynamoelectric machines during times of non-usuage.

Copending W. E. Case No. 47,316, filed Sept. 23, 1977, having Ser. No. 836,172, and assigned to the assignee of the present invention discloses an apparatus for producing coil bar shapes by wrapping them around a convex, frusto-conically shaped member. Such disclosure teaches a solid mass of material constituting the frusto-conical shape. A disadvantage in using such member is that its major and minor diameters and thus the cone angle are fixed for each frusto-conical member. Since different dynamoelectric machines have different stator sizes and different coil bar cone angles, the solid frusto-conical member disclosed in the copending application can require vast amounts of storage space between times of actual usage in forming coil bars. An additional disadvantage of the aforementioned solid forming member is that it can be used in the forming apparatus for only one size dynamoelectric machine, necessitating the forming machine's disassembly and insertion therein of another forming member whenever coil bars are to be made for a different sized dynamoelectric machine.

As such, it would be advantageous to use a coil bar forming apparatus which had an adjustable frusto-conical coil shaper which was adaptable to different size dynamoelectric machines and the coils' cone angles required therein.

SUMMARY OF THE INVENTION

In accordance with the present invention, an improved apparatus is provided for forming electrical coil bars for dynamoelectric machines. The invention generally comprises means for bending a first end portion of a coil bar at selected angels from an adjacent coil portion, a rotatable member of frusto-conical shape whose cone angle is adjustable to any said selected angles, means for rotating the rotatable frusto-conical member through selected angular displacements, and means for guiding the coil bars end portion against the conical surface of the rotatable member in a spiral configuration about its axis of rotation during angular displacement of the frusto-conical member. In a preferred embodiment of the invention the rotatable, frusto-conical member constitutes a shaft disposed along the member's axis of rotation, a plurality of radially extensible struts situated at one end of the shaft, a plurality of support members situated at the opposite end of the shaft, and a plurality of shaping ribs pivotally mounted at one end to the struts and slidably mounted at their other ends to the support members. Such coil bar shaping apparatus may be used on both ends of unshaped coil bars for simultaneously shaping those ends into suitable configurations for use in dynamoelectric machines.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENT

Figure 1:
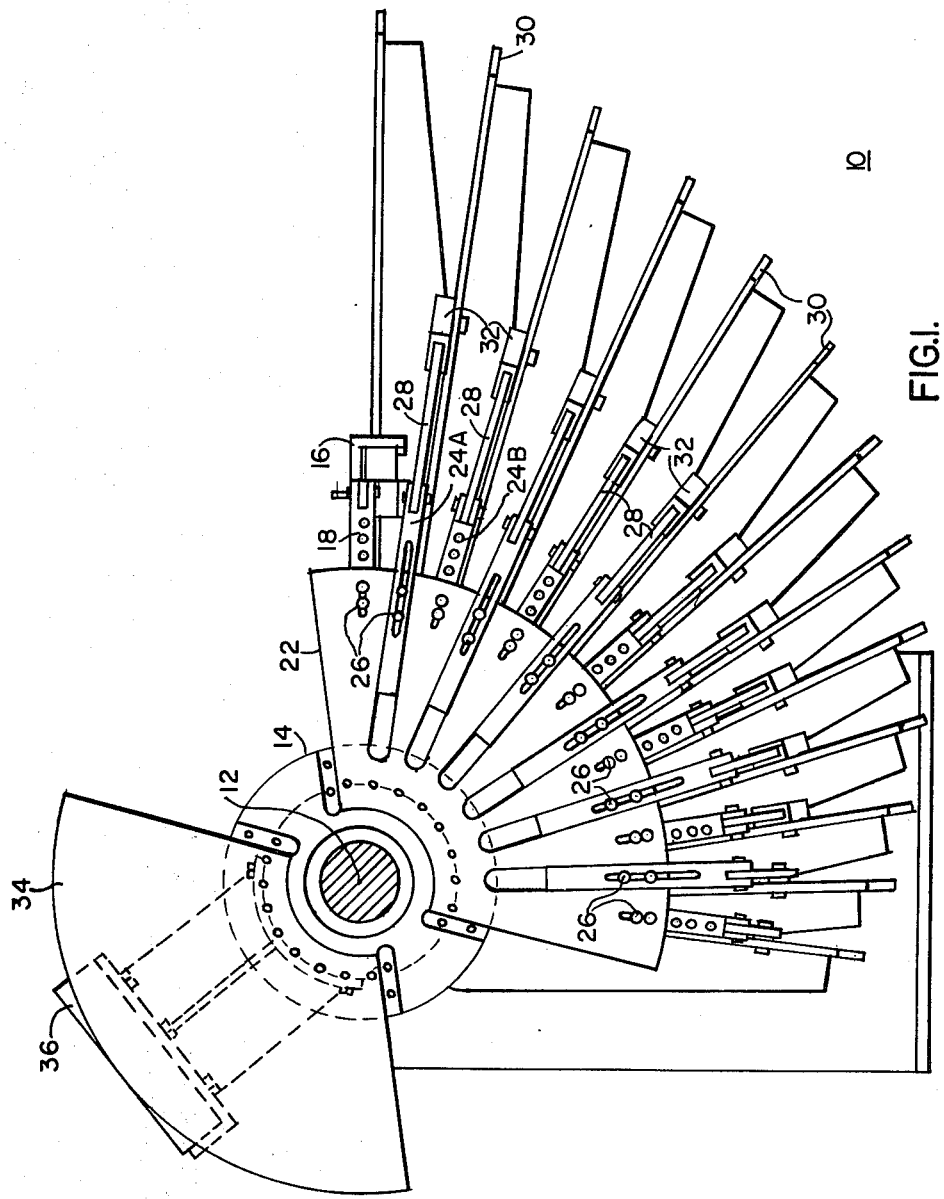
FIG. 1 is an end view of the preferred embodiment of an electric coil bar forming apparatus.

The present invention is concerned primarily with shaping apparatus for electrical coils of dynamoelectric machines. Specifically, the present invention is intended to be a component of the invention described in Ser. No. 836,172, whose applicants are M. Kolesar and H. Rettger. The aforementioned, copending patent application was filed Sept. 23, 1977 and is hereby incorporated by reference.

A rotatable frusto-conical member 10 of adjustable cone angle is rotatable about axis 12 on shaft 14. A lead bend block and associated assembly 16 is disposed on drop bend bar 18 as it was in the aforementioned copending patent application. The coil workpiece which is formable on the present invention is not shown in FIGS. 1 through 3, but it is to be understood that such coil cooperates with the previously-mentioned forming components and cell bend-drop bend radii former 20, illustrated in FIG. 3, in the same manner as did the coils in the copending patent application.

Figure 2:
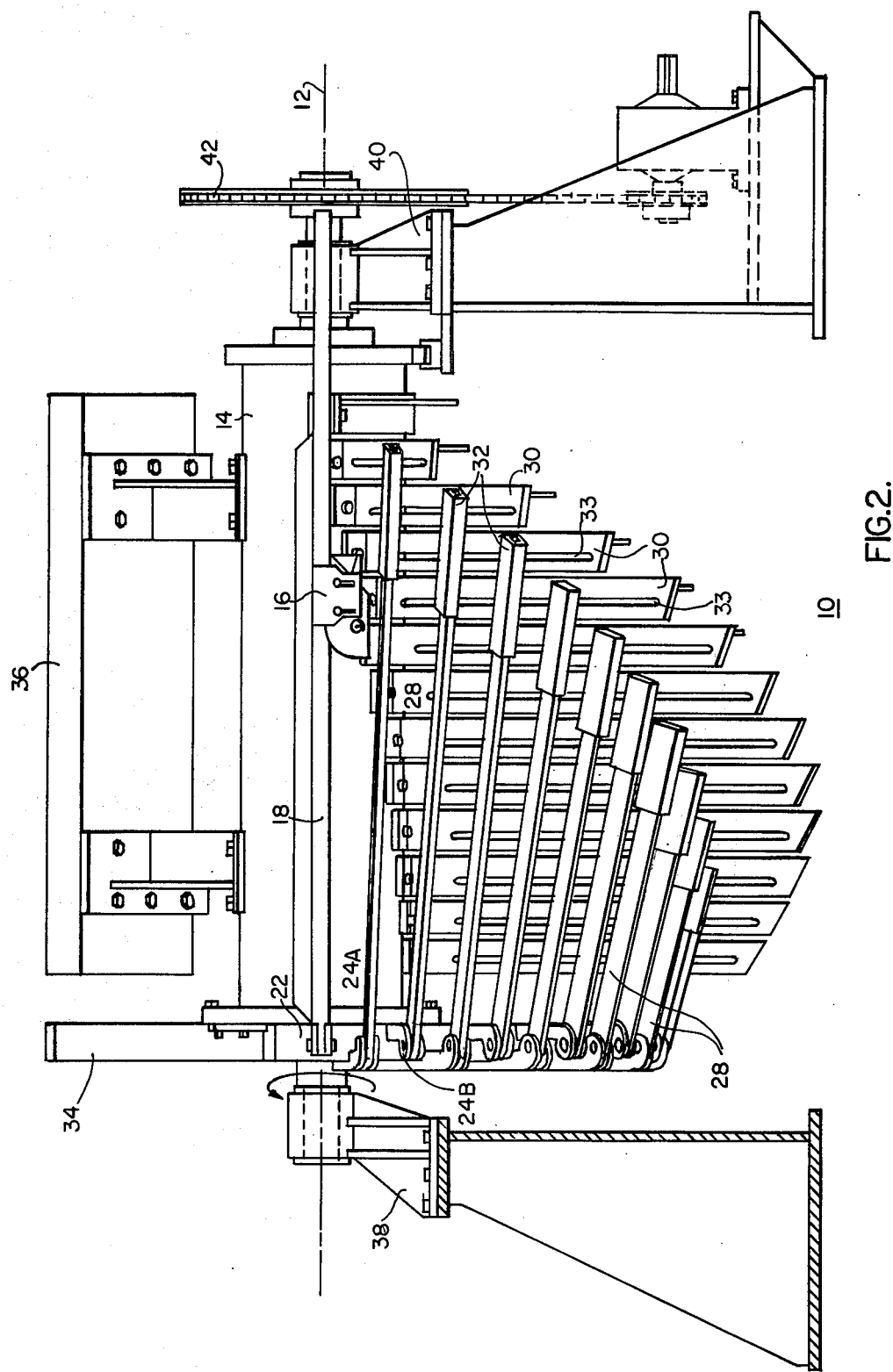
FIG. 2 is an elevation view of the apparatus illustrated in FIG. 1.
Figure 3:
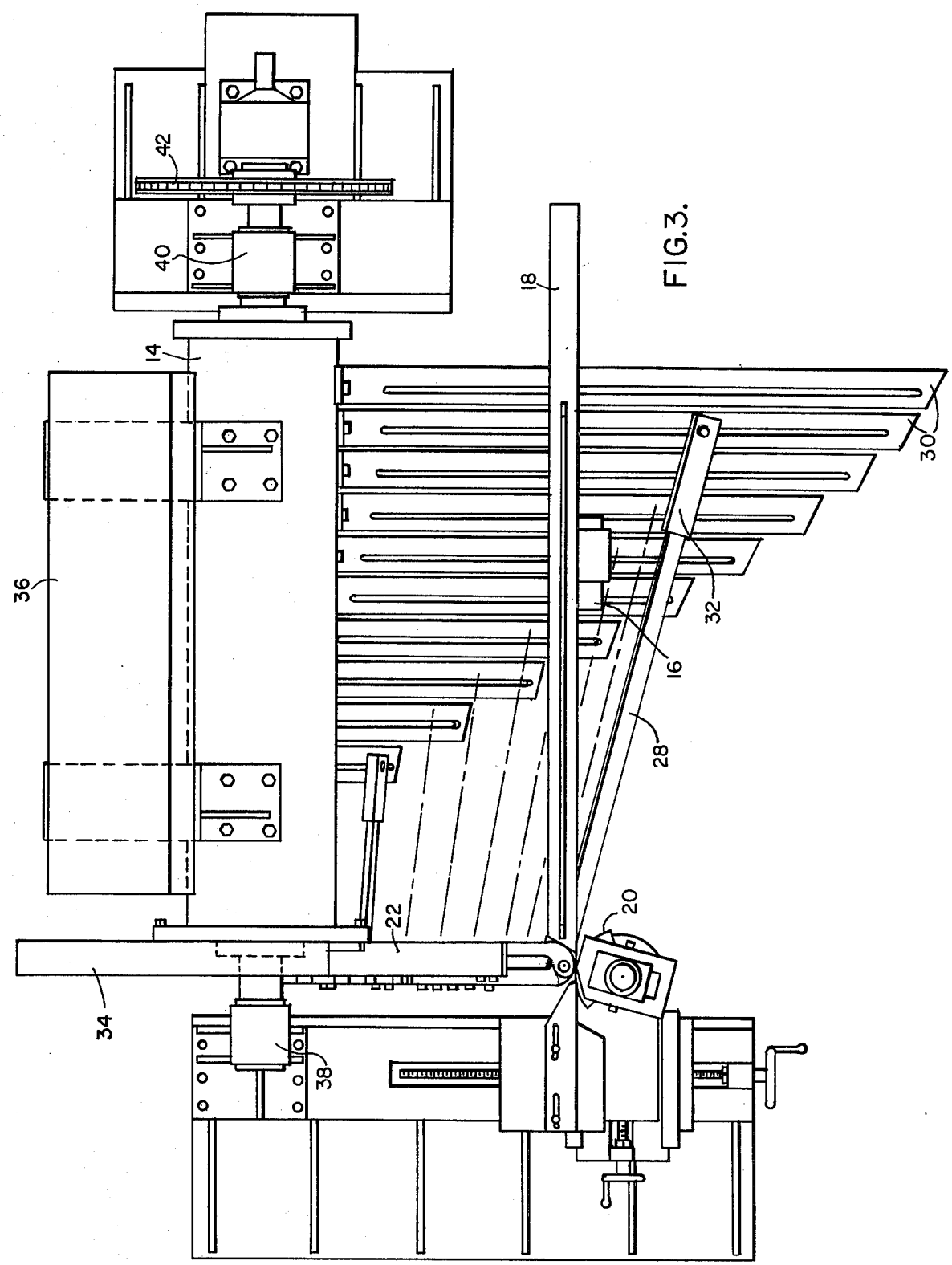
FIG. 3 is a plan view of the apparatus illustrated in FIG. 1.

Since FIGS. 1, 2, and 3 are axial, side, and plan views respectively, the component parts of the present invention's adjustable cone and their relative configuration may be more effectively understood by viewing FIGS. 1 through 3 simultaneously rather than sequentially. Face plate 22 situated at one axial end of shaft 14 provides a structural foundation against which radially-extensible struts 24A and 24B are securable. Struts 24A and 24B are alternated in the circumferential direction and are disposed on opposite axial sides of face plate 22 so as to permit greater ranges of radial extension than would be possible if such struts were disposed on one axial side only of face plate 22. The extensible struts 24A and 24B are preferably secured to face plate 22 by threaded fasteners appropriately disposed to permit loosening and tightening thereof from the more accessible side of face plate 22. Slots formed in struts 24A cooperate with threaded openings in face plate 22 to receive threaded fasteners 26 and thus permit radial extension thereof to predetermined distances whose radial extents are limited by the length of slot. Struts 24B have threaded holes disposed therein which cooperate with slots formed in face plate 22 to receive threaded fasteners 26. Disposal of such threaded openings in struts 24B and slots in face plate 22 provide capability for radially-extending struts 24B to predetermined locations. The threaded openings in struts 24B are separated by distances less than or equal to the length of the cooperating slots in face plate 22.

Pivotably mounted at the radially outer ends of struts 24A and 24B are shaping rib members 28. Support members 30 extend radially from shaft 14 and are spaced circumferentially thereabout to be in general alignment with struts 24A and 24B. Translation blocks 32 are slidably disposed on shaping rib members 28 with each block having a threaded opening therein which, when generally aligned with the support member's slot 33, can receive a threaded fastener therein. Shaping ribs 28 form a frustoconical member whose minor diameter may be selectively adjusted by radially-extending struts 24A and 24B and whose major diameter may be independently adjusted by pivoting shaping rib members 28 at the radially outer end of the strut members and securing translation blocks 32 at a selected radial distance from shaft 14 along slots 33 of support members 30.

After the desired positioning of struts 24A and 24B and the disposition of translation blocks 32 relative to support members 30, the coil formation process as detailed in the copending patent application may be performed. Face plate counter balance member 34 and the frustoconical member's counterbalance 36 are disposed to reduce the torque necessary to rotate shaft 14 and shape the coil members in question. Frustoconical shaft 14 is reduced in radial extent at each axial end of the frustoconical member to be mateable with bearings supported by the front bearing pedestal 38 and rear bearing pedestal 40. The torque required for shaping the coil members is preferably supplied to shaft 14 through sprocket 42. As can be seen from viewing FIGS. 1 through 3, shaping rib members 28 and support members 30 decrease in length as the rib members' angular displacement from drop bend bar 18 increases. In the illustrated example of FIGS. 1 through 3, shaft 14, as viewed in FIG. 1, is operationally rotatable in the counterclockwise direction. It is to be understood that while shaping ribs 28, support members 30, and axial separation distances between the struts and support members 30 vary in length, the aforementioned components could be fabricated to have equal lengths. However, such varying of lengths is useful for reducing the weight of the apparatus, decrease material requirements for its manufacture, and increase the strength of some of its members. While the aforementioned, copending patent application utilizes a relatively smooth frustoconical forming surface, it has been found that discontinuous surfaces such as are formed by shaping ribs 28 of the present invention provide a forming surface more than adequate to precisely shape coil bars for insertion in dynamoelectric machines.

Figure 4:
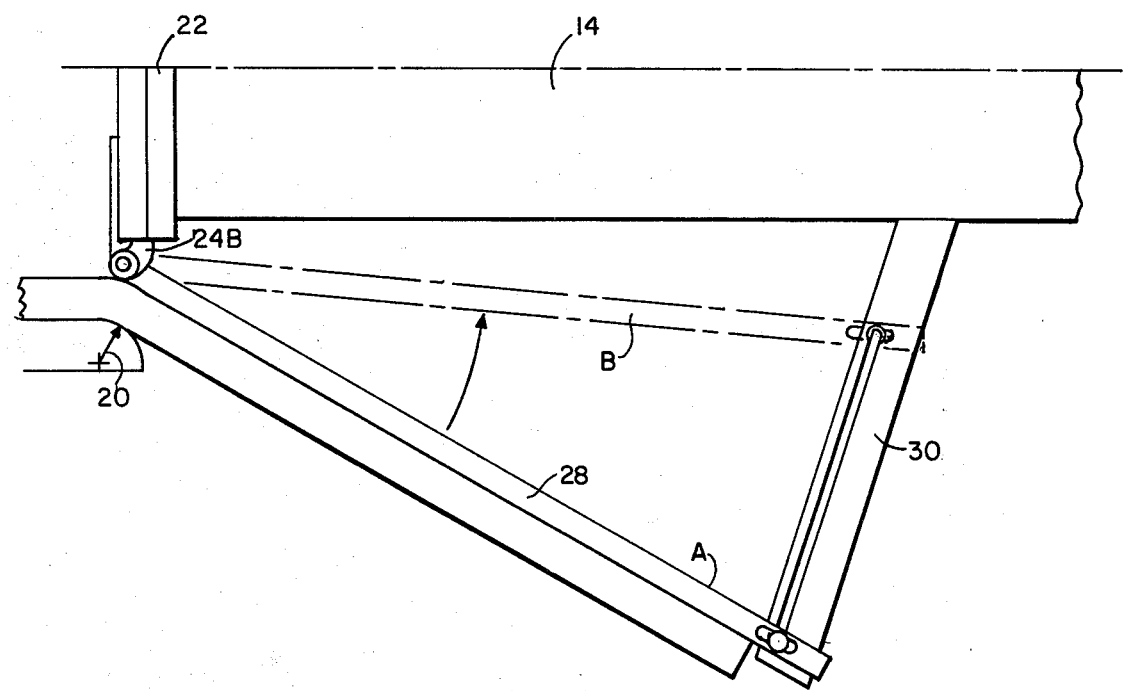
FIG. 4 is an additional embodiment of the invention.

FIG. 4 illustrates an alternate mounting method for connecting shaping ribs 28 to support members 30. Slots formed in both of the aforementioned members are capable of receiving a fastener therethrough. By pivoting one end of shaping ribs 28 on struts 24B, the other end of shaping rib 28 may be moved relative to support member 30 and secured in position by tightening the threaded fastener disposed through the cooperating slots. The extreme positions A and B illustrate the range of major cone diameters to which the apparatus is adaptable. While only single shaping apparatus 10 has been illustrated, it is to be understood that two such apparatus 10 could be utilized on opposite ends of each coil bar to permit simultaneous coil bar end formation.

It will now be apparent that an improved coil bar shaper apparatus has been provided in which the frustoconical former may be infinitely adjusted within predetermined limits to produce frustoconical surfaces of selected cone angles. Such adjustable shaping feature results in a shaping apparatus whose forming surfaces can be altered to comply with the requirements of any dynamoelectric machine without changing components of the apparatus when forming coils for different sized dynamoelectric machines.

We claim:
1. An apparatus for forming electrical coil bars for dynamoelectric machines, said apparatus comprising:
   means for bending a first end portion of a coil bar at selected angles to an adjacent coil bar portion;
   a first rotatable member of frusto-conical shape whose axis of rotation is substantially parallel to the coil bar's adjacent portion, said frusto-conical member having a cone angle whose magnitude is adjustable to any of said selected bending angles;
   means for rotating said first rotatable member through selected angular displacements; and
   means for guiding the coil bar's first end portion against the conical surface of said frusto-conical member in a spiral configuration about the axis of rotation during said angular displacement of said frusto-conical member.

2. The apparatus of claim 1, said first rotatable member comprising:
   a shaft disposed along said axis of rotation;
   a plurality of substantially radially extensible struts situated at one end of said shaft, said struts being securable in selected radial positions to provide a first conical diameter;
   a plurality of support members connected to the other end of said shaft; and
   a plurality of shaping rib members extending between said radially extensible struts and said support members, said ribs being pivotably mounted at one end on said struts and slidably mounted at their other end on said support members, said slidable mounting being securable in selected positions to provide a second conical diameter of desired magnitude.

3. The apparatus of claim 2, said slidable mounting between said cooperating rib members and supporting members comprising:
a plurality of cooperatively associated slots formed in said ribs and said support members; and
a plurality of fasteners receivable in said slots, said fasteners providing selective relative positional securement of said support and said ribs.

4. The apparatus of claim 2, said slidable mounting between said cooperating rib members and supporting members comprising:
a plurality of translation blocks slidably mounted on at least one of each pair of cooperating members, said translation blocks each having an opening therein which cooperates with a slot formed in the remaining member of the pair; and
a plurality of fasteners receivable in said cooperating holes and slots, said fasteners providing selective relative positional securement of said support members, said translation blocks, and said shaping rib members.

5. The apparatus of claim 2 wherein said support members and said struts are in general angular alignment about the shaft.

6. The apparatus of claim 2 wherein said support members and said struts are axially separated by varying distances, said support members and shaping rib members mounted thereon having lengths which decrease as said axial separation distances decrease.

7. The apparatus of claim 6 wherein said decreasing lengths of said support members, shaping ribs, and axial separations occur in a continuous trend about the shaft for a predetermined angular displacement.

8. The apparatus of claim 1, further comprising:
means for bending a portion of said coil bars at the second end at selected angles from said adjacent portion which separates said end portions;
a second rotatable member of frusto-conical shape whose axis of rotation is substantially parallel to the coil bar's adjacent portion, said frusto-conical member having a cone angle whose magnitude is adjustable to equal any of said selected angles;
means for rotatably linking said first and second rotatable members, said linking means providing simultaneous rotation of said rotatable members during formation of the coil bar's end portions associated with each rotatable member; and
means for guiding the coil bar's second end portion against the conical surface of said frusto-conical member in a spiral configuration about the axis of rotation during said angular displacement of said second frusto-conical member.

* * * * *